Jan. 20, 1953   J. D. LEITCH   2,626,377
COMBINATION OF AN ELECTRIC SWITCH AND AIR CORE
REACTOR FOR PROTECTING ELECTRICAL EQUIPMENT
FROM EXCESSIVE FAULT CURRENTS
Filed Jan. 12, 1949   4 Sheets-Sheet 2

INVENTOR.
JOHN D. LEITCH

HIS ATTORNEYS

Jan. 20, 1953 J. D. LEITCH 2,626,377
COMBINATION OF AN ELECTRIC SWITCH AND AIR CORE
REACTOR FOR PROTECTING ELECTRICAL EQUIPMENT
FROM EXCESSIVE FAULT CURRENTS
Filed Jan. 12, 1949 4 Sheets-Sheet 3

INVENTOR.
JOHN D. LEITCH
his ATTORNEYS

INVENTOR.
JOHN D. LEITCH
ATTORNEYS

Patented Jan. 20, 1953

2,626,377

UNITED STATES PATENT OFFICE 2,626,377

COMBINATION OF AN ELECTRIC SWITCH AND AIR CORE REACTOR FOR PROTECTING ELECTRICAL EQUIPMENT FROM EXCESSIVE FAULT CURRENTS

John D. Leitch, Shaker Heights, Ohio, assignor to The Electric Controller & Manufacturing Company, Cleveland, Ohio, a corporation of Ohio Application January 12, 1949, Serial No. 70,578

23 Claims. (Cl. 318—229)

This invention relates to a combination of an electric switch and air core reactor for protecting from excessive fault currents electrical equipment controlled by the switch and particularly to alternating current motor starters which are protected from excessive fault currents.

This application is a continuation-in-part of my application Serial No. 19,392, filed April 6, 1948, and now abandoned.

A principal object of the present invention is to so correlate the current limiting ability of an air core reactor means and the interrupting capacity of a contactor so that, when they are connected in series with each other in a branch line feeder having a relatively low normal kva. capacity as compared to the available short-circuit kva., a balance is reached in which a disproportionate decrease in the physical size of the reactor means is obtained which more than offsets the increased size and complexity of the contactor compared to a contactor of less interrupting capacity.

Another object of this invention is to provide, in an alternating current feeder for a load having a relatively small normal kva. capacity but supplied from a source having a very large available short-circuit capacity, a circuit interrupter having an interrupting capacity greatly in excess of the normal kva. required by the load but substantially less than the available short-circuit kva. and a series reactor capable of limiting the available short-circuit kva. to a value below the interrupting capacity of the contactor.

A more specific object and equally important object of this invention is to provide a motor starter which is self-protecting so that the contactor of the starter itself can interrupt the motor circuit under fault conditions even though the motor is connected to a source capable of supplying more power to a fault than the rated capacity of the contactor.

An alternating current motor starter for across-the-line starting of high voltage alternating current motors generally comprises an electromagnetic contactor immersed in an insulating fluid such as oil, a potential transformer for supplying a low voltage to the operating coil circuit of the contactor, two or more overload relays for controlling the contactor coil circuit, and a push-button station. The starter may also include one or more meters and suitable manually operable isolating or disconnect switches. Preferably the contactor is capable of rapid and prolonged repetitive operation. It is desirable that all parts of the starter except the push-button station be mounted within a unitary enclosure.

Such motor starters have a continuous capacity determined by the horsepower of the largest motor which they can safely control. They are also rated according to the maximum kilo-volt-amperes, hereinafter abbreviated to kva., which they are capable of interrupting without failure. When it is necessary that the starter itself be capable of interrupting the motor circuit under short-circuit conditions, the interrupting capacity of the starter does not depend upon the horsepower of the motor but is determined by the maximum kva. that the power system is capable of supplying to the fault.

For motors operable at voltages within the range of 2200 to 4600, starters which have interrupting capacities of 50,000 kva. are currently being manufactured and are recognized as standard by the industry. However, many power systems supplying such high voltage motors are capable of furnishing power in excess of 50,000 kva. to a fault in the motor circuit. Heretofore, for such applications, it has been necessary to protect the starter by the use of either a circuit breaker or fast-operating fuses. Circuit breakers of the required capacity are not only very expensive but also generally do not open until several cycles of short-circuit current have passed to the starter. These few cycles of short-circuit current are often sufficient to damage the starter either due to heating or to the disruptive effect of the current, or both. It is often necessary, when a circuit breaker is used, to provide the starter contactor with a latch to insure that the circuit breaker and not the starter opens first under fault conditions. The use of a latch is a definite disadvantage because it impairs the inching ability of the starter.

Fast-operating fuses have proved to be satisfactory for protecting high voltage starters from excessive fault currents. These fuses are capable of interrupting the fault current during the first quarter-cycle and thus limit the maximum value of the short-circuit current. However, such specialized fuses are extremely costly initially and, after each operation, must be replaced essentially in their entirety. The user of the equipment, therefore, must maintain a supply of spare fuses. Furthermore, the fuses must be selected on the basis of both the available short-circuit current and the motor horsepower and any material change in the former requires the changing of the fuses. Thus proper fuse application can be made only if the available kva. of the system is accurately known at all times. In addition, for many applications, it is difficult to provide a fuse of the proper protective rating which will not open the circuit in response to normal starting current flowing to the motor.

For test purposes adjustable air-core reactors have been inserted into the circuit ahead of a motor starter to reduce the known kva. of the source to the kva. that is to be applied to the starter for the particular test to be made, for example, to determine the ultimate interrupting capacity of the starter.

It was believed that any current-limiting reactor used with a motor starter would be disproportionately large relative to the starter and consequently not practical commercially.

It was not realized that many factors involved in the limitation of current by reactors are so interrelated with the characteristics of the starter itself that, by proper correlation thereof, a starter could embody relatively small reactors in such a manner as to make it self-protecting and commercially feasible.

The present invention is based on the discovery that current-limiting, air-core reactors of the huge size required to limit the kva. of power system feeders generally are not in fact necessary for the great majority of high-voltage starter applications if certain factors of the starter and reactors are properly correlated, and consequently reactors of much smaller size can be used to limit the available short-circuit kva. to a value below the interrupting capacity of the starter. In fact, it has been found that current-limiting, air-core reactors may be combined with a starter and incorporated within the starter enclosure with very little increase in outside dimensions to render a starter rated up to 600 H. P. at 60 cycles and having a contactor rated at 25,000 or 50,000 kva. useable, without the usual circuit breaker or current-limiting fuses, on systems having the ability from a theoretical standpoint to supply unlimited or infinite kva. to a fault.

Again, in connection with very low horsepower motors and their starters, for example motors from five to fifteen horsepower, it has been observed that the coils of magnetic overload relays acted to some extent to limit fault currents. This phenomenon is due to the fact that overload coils for small motors have a relatively large number of turns. As the size of the motor is increased less turns are required. Such reductions in the number of turns correspondingly reduce whatever current limiting effects are inherent in the coils.

I have found that, instead of reducing the size of overload coils, as is customary, an operating advantage can be obtained by deliberately increasing the number of turns, or correspondingly, if the motor size requires it, by adding additional coils, to provide a relatively large number of turns in the starter circuit, this advantage being that fault currents can be sufficiently limited by coils of reasonable size when the value of the fault currents is correlated properly to the interrupting capacity of the starter contactor, as hereinafter pointed out.

Heretofore, in order to determine the proper starter size or the rating of the circuit breaker or fuses, the starter manufacturer had to rely upon his customer's estimate of the available short-circuit kva. of the system, and in many cases the customer had to rely upon the power company's estimate of ultimate system capacity. Consequently, either due to faulty estimation of the system capacity or because the system capacity was increased without the starter user's knowledge, many starter failures have occurred. Since starters built in accordance with this invention are capable of positively interrupting the motor circuit under all fault conditions irrespective of the available kva., they cannot fail for this season.

Another object is to provide an alternating current motor starter capable of interrupting its motor circuit under fault conditions regardless of the available short-circuit kva. of the power supply.

Another object is to provide an improved motor starter having a contactor of predetermined interrupting capacity yet which can be used safely on a power system having a short-circuit kva. capacity in excess of said predetermined interrupting capacity.

An additional object is to provide an alternating current motor starter including current limiting means that is indestructible upon short circuit and which limits the short circuit current to a value that can be interrupted by the starter contactor.

It has been found that motor starters having built-in air-core reactors capable of limiting infinite available short circuit kva. to 25,000 kva. can be used for the great majority of high voltage A.-C. motor applications where substantially full voltage starting characteristics are required. In the case of starters for motors of relatively large horsepower, the reactors not only become too large to be mounted conveniently within the starter enclosure, but also cause a reduction in starting voltage which may be excessive for certain applications. As the horsepower of the motor increases, the percentage of starting voltage reduction caused by the current-limiting air-core reactors increases. In many cases, the reduction in starting voltage is desirable since full voltage starting of larger motors is often a material disadvantage even though not sufficiently so to warrant the use of extra equipment required for a conventional reduced voltage starter.

In those instances wherein conventional reduced voltage starting heretofore would have been required, the present invention also possesses many advantages. Since the reactors added for short-circuit protection effect some reduction in starting voltage, a smaller than usual amount of reactance need be added to provide the desired value of reduced starting voltage. At the end of the starting period, the additional reactance may be by-passed by operation of a contactor as in the usual reactor-type, reduced voltage starter. It has been found that the amount of reactance required in addition to that provided for short-circuit protection is so small as to permit the use of air-core starting reactors instead of iron-core reactors which heretofore have been used for reduced voltage starting of high voltage motors. The advantages resulting from the use of air-core reactors instead of iron-core reactors are the saving in over-all weight, ease of mounting, and the more simple manufacturing techniques required. These advantages, in many cases, more than offset the cost of the increased amount of copper required in an air-core starting reactor over that required in an iron-core starting reactor of comparable rating. In some instances, it is desirable to include both the short-circuit protecting reactance and the reduced voltage starting reactance in a single coil. Even in those instances where short circuit protection is not required, it has been found that air-core reactors have the foregoing advantages over iron-core reactors to a material but lesser degree.

A further object is to provide a reduced voltage alternating current motor starter in which air-core reactors are used to provide the reduction in starting voltage.

An additional object is to provide a reduced voltage alternating current motor starter in which air-core reactors are used to provide the reduced starting voltage as well as to provide short-circuit protection during both starting and running.

A still further object is to provide a motor starter capable of providing short-circuit protection even when connected to a source of infinite available short-circuit capacity in which the interrupting capacity of the contactor and the reactance of a current-limiting reactor are so correlated as to cause a disproportionate reduction in physical size of the reactor as the interrupting capacity of the contactor is increased and in which the reactance of the current-limiting reactor is utilized in cooperation with additional reactance to provide a desired value of reduced motor starting voltage.

Other objects and advantages will become apparent from the following description wherein reference is made to the drawings, in which.

Figures 1, 2, 3, 6, 8:
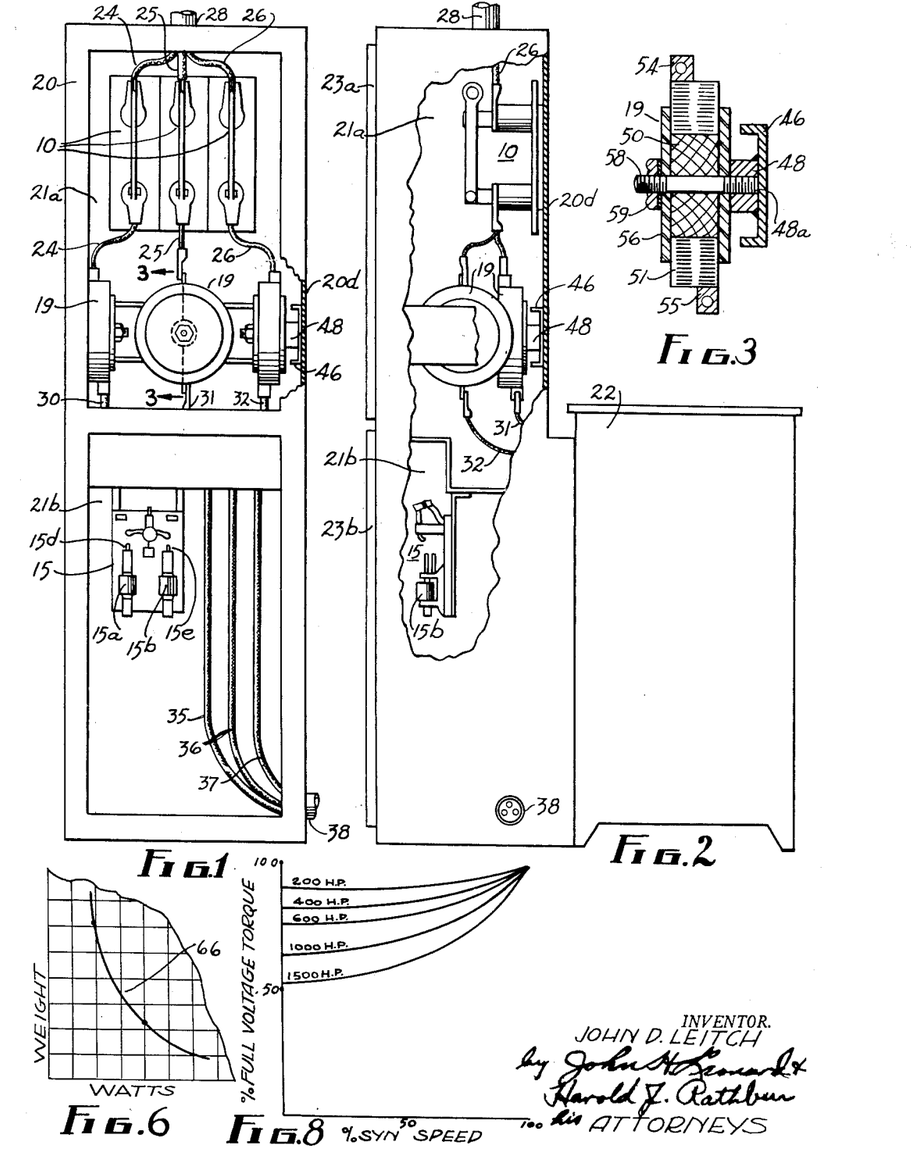
Fig. 1 is a front view of a starter built in accordance with this invention, the doors having been removed from the enclosure.
Fig. 2 is a side elevation of the starter of Fig. 1 with a portion of the enclosure wall broken away.
Fig. 3 is a cross sectional view taken along the line 3—3 of Fig. 1.
Figs. 5, 6, 7 and 8 are graphs to aid in understanding the invention.
Figure 4:
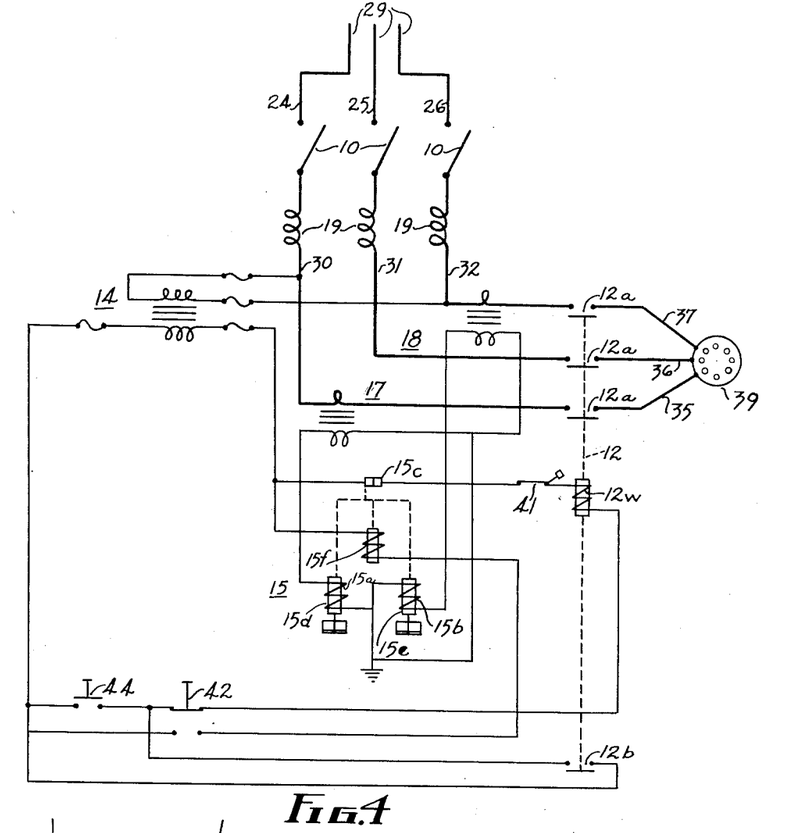
Fig. 4 is an elementary wiring diagram of the starter shown in Figs. 1 and 2.

Although the invention is applicable for controlling any type of alternating current motor, it is illustrated herein in conjunction with a high-voltage, three-phase, three-wire, squirrel-cage, induction motor. Referring to Figs. 1, 2, and 4, the illustrative starter comprising a plurality of disconnect switches 10, an electromagnetic contactor 12, a potential transformer 14, and an overload relay 15 having operating windings 15a and 15b which are supplied from a pair of current transformers 17 and 18. Since the starter shown in the drawings is for a three-phase, three-wire motor, there are three disconnect switches 10, the contactor 12 has three normally-open main contacts 12a, and the overload relay 15 has the usual two operating windings. In addition, the starter comprises, in accordance with this invention, a plurality of air-core reactors 19 connected in the primary leads to the motor, respectively, and to be described in detail hereinafter. The reactors 19 and other starter components are contained within a suitable enclosure 20 defining upper and lower chambers 21a and 21b and including a tank 22 containing oil or other suitable insulating fluid. The contactor 12 and the transformers 14, 17, and 18 are disposed in the usual manner in the tank 22 under the surface of the oil and the mounting thereof is not shown in detail. The disconnect switches 10 and the reactors 19 are mounted in the upper chamber 21a and the overload relay 15 is mounted in the lower chamber 21b. Doors 23a and 23b are provided for the chambers 21a and 21b, respectively. Only the power conductors within the chambers 21a and 21b are shown in Figs. 1 and 2, but all of the necessary conductors are shown in the wiring diagram of Fig. 4.

The disconnect switches 10 are interposed in a plurality of power conductors 24, 25, and 26, respectively, which enter the chamber 21a through a conduit 28 at the top of the enclosure 20 and which extend between a power source 29 and respective upper terminals of the air-core reactors 19. The conductors 24, 25, and 26 constitute a branch circuit feeder of relatively low kva. capacity which in the present instance is a feeder supplying only a motor 39. The power source 29 may be of any suitable type and, as explained hereinafter, may have an available short-circuit kva. of any amount which theoretically may be considered as infinite. Power conductors 30, 31, and 32 extend from the respective lower terminals of the reactors 19 and pass from the chamber 21a into the tank 22 where they are connected to one side of the main contacts 12a, respectively, of the contactor 12. Primary windings of the transformers 17 and 18 are interposed in the conductors 30 and 32, respectively, between the reactors 19 and the contacts 12a. Power conductors 35, 36, and 37 extend from the other side of the contacts 12a into the chamber 21b to a conduit 38 at the bottom of the enclosure 20 from whence they are connected to the motor 39.

The potential transformer 14 has its primary winding connected across the conductors 30 and 32. The energizing circuit for an operating winding 12w for the contactor 12 is connected across the low-voltage secondary winding of the transformer 14 and includes normally closed contacts 15c of the overload relay 15, contacts of a door switch 41 operated by the door 23a, normally closed contacts of a push button 42, and normally-open contacts of a push button 44. The push buttons 42 and 44 may be mounted at any convenient location. The contacts of the push button 44 are by-passed upon closure of normally-open auxiliary contacts 12b of the contactor 12.

The overload relay 15, which may be of any suitable type and which is illustrated as one built in accordance with Rippl Patent No. 1,305,937 and commercially available, comprises a pair of magnetic plungers 15d and 15e actuated by the operating windings 15a and 15b, respectively. Over energization of the windings 15a and 15b causes upward movement of the plungers 15d and 15e and consequent opening of the contacts 15c. This upward movement is substantially instantaneous upon the occurrence of an excessive current due to a short circuit, but is preferably delayed, as explained in the said Rippl patent, if the excessive current is of a moderate amount. The contacts 15c of the overload relay may be arranged to be reset manually, or, as shown, may be reset electromagnetically upon energization of a reset winding 15f controlled by normally open contacts of the push button 42 and supplied from the transformer 14.

The disconnect switches 10 are mounted in the uppermost portion of the enclosure 20 so as to be sufficiently high above the floor level to prevent accidental contact therewith when the door 23a is open. The door switch 41 is closed whenever the door 23a is closed, but is opened when the door 23a os opened thereby to insure that the contactor 12 has interrupted the motor circuit before the disconnect switches can be operated.

The air-core reactors 19 provided by this invention are preferably mounted immediately beneath the disconnect switches 10. This facilitates the connections of the high voltage conductors since it is desirable that the disconnect switches when open disconnect the reactors from the power source. It is important that the reactors be constructed and mounted so as to withstand the magnetic forces that occur therein and therebetween during a fault. The novel reactor construction, arrangement, and mounting now to be described accomplishes this necessary result. A plurality of U-shaped angles 46 are welded to side and rear walls 20d, respectively, of the enclosure 20 within the chamber 21a. At the midpoint of the rear wall 20d, a cylindrical block 48 preferably of steel is welded to one of the angles 46 between the flanges thereof. The block 48 has a central tapped opening 48a (Fig. 3). Likewise, similar blocks 48 are welded to the other angles 46, respectively, on the opposite side walls 20d of the enclosure 20.

As shown most clearly in Fig. 3, each of the air-core reactors 19 comprises a central cylindrical core 50 preferably of wood about which is tightly wound a double-layer strap winding 51 having a pair of terminals 54 and 55. The strap conductors are preferably insulated with impregnated glass tape or other insulating material capable of withstanding large compression forces and providing good insulating properties. The winding is confined between a pair of insulating discs 56 preferably of Bakelite or the like. A non-magnetic bolt 58 passing through aligned central openings in the core 50 and the discs 56 is threaded into the opening 48a in the block 48. The outer end portion of the bolt 58 receives a nut 59 which bears against the outer disc 56. The two reactors 19 mounted on the opposite side walls 20d of the enclosure are sufficiently far apart to minimize the magnetic forces therebetween when large currents flow therethrough. The magnetic axis of the reactor 19 mounted on the rear wall of the enclosure 20 is at right angles to the magnetic axes of the other two reactors 19 and hence magnetic forces therebetween are also minimized. In addition, it might be desirable in some instances that the phase relation of the several line currents and the winding direction of the reactor windings be such that the respective torques exerted on the reactor mounted on the rear wall by the two reactors on the side walls be in opposition. The net torque on the rear reactor is thus a minimum even under unbalanced conditions.

The starter of Figs. 1, 2 and 4 operates as follows:

When the switches 10 and the upper door 23a are closed, momentary closure of the push button 44 completes an energizing circuit for the winding 12w from the transformer 14 through the overload relay contacts 15c, the door switch 41, and the normally closed contacts of the push button 42. Energization of the winding 12w causes operation of the contactor 12 which closes its main and auxiliary contacts. The main contacts 12a complete the circuit from the power source 29 through the disconnect switches 10, the air-core reactors 19, and the primary windings of the transformers 17 and 18 to the motor 39. Closure of the auxiliary contacts 12b of the contactor 12 completes a by-pass circuit around the push button 44 so that the winding 12w continues to be energized after the push button 44 is reopened.

The motor 39 may be deenergized at any time by depression of the push button 42 thereby opening the circuit to the winding 12w. If the motor 39 is subjected to a moderate overload, the windings 15a and 15b cause their respective plungers 15d and 15e to rise gradually. If the overload continues, one or the other or both of the plungers 15d and 15e cause opening of the contacts 15c. Opening of the contacts 15c deenergizes the winding 12w and the contactor 12 returns to its normal position opening the contacts 12a and deenergizing the motor. If it is desired to restart the motor 39 after an overload, the push button 42 must first be momentarily depressed to complete the circuit from the transformer 14 for the reset winding 15f which causes the contacts 15c to reclose.

In event of a sudden large overload, such as a short circuit, one or the other or both of the plungers 15d and 15e rise substantially instantaneously to open the overload contacts 15c which deenergizes the contactor 12 and disconnects the motor 39. The maximum value of this overload current is definitely limited by the reactance of the air-core reactors 19 so that the kva. supplied to the fault is kept below the interrupting capacity of the contactor 12.

Air-core reactors used on power systems for limiting the kva. available under fault conditions are designed to carry extremely large currents continuously. Because of the relatively large normal power system currents, the ohmic reactance of reactors used on power systems is limited to very small values so as not to reduce materially the system voltage and consequently the fault currents cannot be reduced to very low values. Reactors for such applications comprise conductors of considerable cross section in order to minimize the heat losses and require expensive and space-consuming methods of bracing the conductors against the disruptive effect of the high fault currents.

Figure 5:
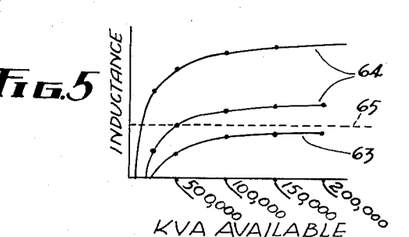
Figure 7:
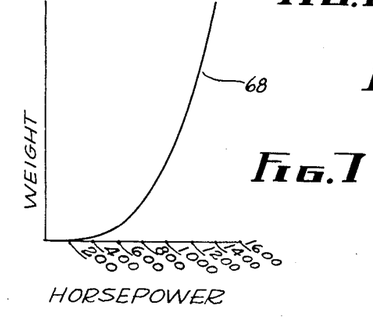

In order to understand the various phenomena of which advantage has been taken to make possible the new combination of this invention, reference may be had to Figures 5, 6, and 7. The available kva. at a short-circuit is dependent upon the reactance of the line between the short-circuit and the source. If the source is assumed to have an infinite kva. capacity, the infinite capacity can be reduced to any desired kva. greater than zero at the short-circuit by adding a finite amount of reactance to the line. However, if it is attempted to reduce the available kva. at a short-circuit on a motor feeder to a value below the interrupting capacity of a starter of moderate interrupting capacity such as the usual type capable of interrupting only ten times its continuous rating, it is found that the use of air-core reactance not only becomes impractical because of the reactor size but also because of the extreme voltage reduction. For example, in the case of a starter for a 600 H. P., 2300 volt, 60 cycle, three phase squirrel cage induction motor, the contactor of which starter has an interrupting capacity of ten times the full load rating of the motor, the reactance necessary to limit an available short-circuit kva. of 200,000 to a steady state kva. value that is 67% of the contactor rating is found to be about 1.29 ohms. Each of three reactors having this ohmic value and designed for a reasonable watts loss weighs 2000 pounds. It is obvious that reactors of such large size are not commercially feasible. However, even if it were decided to build reactors of that size, it is found that when they are in the circuit the voltage reduction is so excessive that the motor starting torque is only 25% of its normal full voltage value, and that, when the motor is running at its normal full load speed, the torque produced is only 80% of its full voltage full load torque. Consequently, it is impossible to combine reactors having adequate current-limiting ability with starters of moderate interrupting capacity and still use the motor for its normal purposes. On the other hand, a reactance of but 0.21 ohm reduces the starting torque of the 600 horsepower motor to only about 80% of its full voltage value and has negligible effect on the running torque. If a reactor of 0.21 ohm is used to reduce the available short-circuit kva. to 4000 kva., that is, to 67% of the rating of the contactor used in the foregoing example, the available short circuit kva. cannot exceed 4800. This amount of kva. reduction is insignificant. Allowing the heat loss to remain the same as in the foregoing example of the reactors having a reactance of 1.29 ohms, each of three reactors having a reactance of 0.21 ohm weigh only 115 pounds. These smaller reactors are capable of limiting infinite available kva. to 25,000. Hence, by combining air-core reactors with starters the contactors of which have high interrupting capacities, reactor size becomes small enough to be practical and the torque reduction is so small as to be negligible.

Accordingly, one of the concepts of this invention is to correlate the reactors and starter contactor by taking advantage of the reduction in the differential between the available short-circuit kva. and the interrupting capacity of a starter contactor of relatively high interrupting capacity so that a balance is reached in which a disproportionate decrease in the size of reactors is obtained which more than offsets the size and complexity of the larger starter contactor as compared to a starter contactor of less interrupting capacity.

A correlative concept is to make the inductance of the reactors 19 such that they limit an infinite available short-circuit kva. while maintaining the correlation above described. The curve 63 of Fig. 5 shows the relation between the inductance of the reactors 19 required for an installation of a certain voltage and frequency to reduce a given available short-circuit kva. capacity to a steady-state value of 25,000 kva. The curves 64 indicate the amount of inductance that would have to be added to reduce the available kva. to certain steady-state values under 25,000 kva., respectively. It will be noted that curve 63 is asymptotic to a straight line 65 parallel to the horizontal axis. Preferably the inductance of each of the reactors 19 is equal to the ordinate of the line 65 thus insuring that even a source which theoretically has an infinite capacity cannot deliver more than a steady-state value of 25,000 kva. to a fault between the resistors 19 and the motor 39 or within the motor itself.

Because of the transient D.-C. components which are always present at the instant of a fault on an A.-C. circuit, the actual kva. rating of the contactor should be greater than the maximum value to which the steady state fault current has been limited by the reactors. The D.-C. components can never exceed 1.73 times the root-mean-square steady state fault current, and at the instant of circuit interruption are always less than that. A factor of 1.5 might be used to establish the maximum interrupting capacity of the contactor with respect to the maximum steady state fault current, but to provide a higher factor of safety, it is preferable that when the reactance is selected to limit the available short-circuit kva. to a steady state value of 25,000, the contactor has an interrupting capacity of 50,000 kva.

This invention is also based on the discovery that when attention is paid to all factors tending to reduce the size of the reactors for small horsepower starters, that these factors are more than cumulative, each augmenting the effects of the others, and that reactors of much smaller size and requiring less cumbersome bracing than ordinarily would be expected can be used. Further, the concept of using a single set of reactors for each motor starter instead of one set on main power feeder further reduces the required horsepower so that still further advantage can be taken of the augmenting effects, thus permitting still smaller size reactors.

In addition to the phenomenon of Fig. 5 of which advantage has been taken to reduce the size of the reactors, advantage has been taken of the phenomenon illustrated in Figs. 6 and 7 wherein weight of conductor is used as a criterion of reactor size.

In Fig. 6, the curve 66 shows that by increasing the watts of heat loss the weight of reactor conductor can be decreased. Since heat loss is not a particularly important factor in motor starter applications because generally the motor does not run continuously, a relatively high heat loss can be tolerated, the resistive voltage drop being of no consequence.

The reactance voltage drop has been found to be inconsequential as to motor operation except during actual starting. If the total voltage drop across the reactors is of the order of 10% or less during starting, satisfactory operation results. Fig. 8 illustrates the amount of torque reduction that is obtained when current-limiting reactors capable of reducing infinite available short-circuit kva. to 25,000 kva. are applied in the control of high voltage motors. The particular motor used to obtain the curves of Fig. 8 is a 2300 volt, 3-phase, 60-cycle machine having a blocked motor current equal to seven times its rated full load current. It is to be noted that for motors up to 600 H. P., the reduced voltage starting torque is approximately 80% or more of the full voltage starting torque. This range of reduction is desirable for many applications since it protects the machinery against sudden applications of high torque at starting and results in less disturbance to the power line. It is also to be noted from Fig. 8 that, as the motor size increases, the percent reduction in starting torque caused by the current limiting reactors becomes greater which is advantageous from the standpoint of power line disturbance.

The curve 68 of Fig. 7 shows the relation between reactor weight and motor horsepower for a given watts loss in the reactor at full load current and at a given frequency. The reactors upon which the curve 68 is based are designed to limit infinite available kva. to 25,000 kva. An examination of curve 68 shows that the weight of the reactor remains very small for motors under 600 H. P., and then increases very rapidly as the motor horsepower is increased from values between 600 and 700 horsepower.

The sharp bend in the curve 68 in the 500 to 700 horsepower region results from the fact that as the horsepower is increased the resistance per unit length of the reactor conductor must be reduced in order to limit the amount of heat developed in the winding. The resistance per unit length of the reactor conductor can only be reduced by increasing the cross section. This increase in cross section to limit heating would cause a less gradual rise in weight with horsepower than is indicated by the curve 68 if it were not for another dependent phenomenon. As the cross section of the reactor conductor is increased, the length of conductor required for each turn is increased which further increases the heat losses and weight. Since the number of turns for a given reactance is fixed, the curve 68 bends very sharply as indicated. The curve 68 has been computed for motors supplied from a source having a frequency of sixty cycles per second. It is obvious that curves computed in like manner for motors of other frequencies will bend sharply but at different horsepower ranges depending upon the frequency.

By taking advantage of the phenomena illustrated by Fig. 8 and by the curves 63, 66, and 68 and combining one set of reactors with only one motor starter, reactors small enough to be mounted within the starter enclosure become possible.

Figure 9:
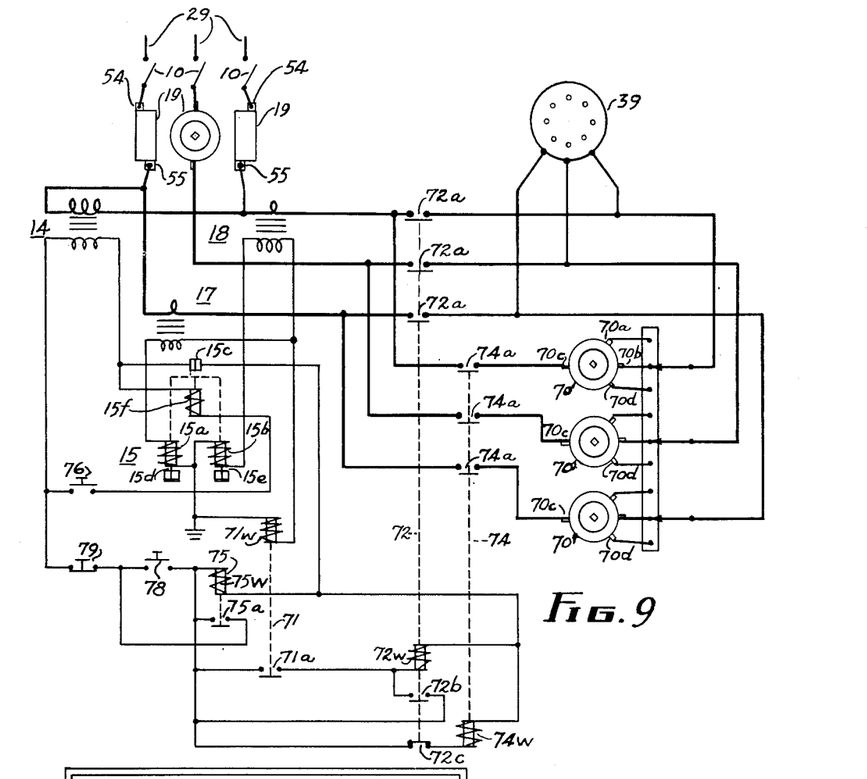
Fig. 9 is an elementary wiring diagram of a reduced voltage starter.

Referring now to Fig. 9, a reduced voltage starter is shown in which a plurality of tapped air-core reactors 70 are arranged to be connected in series with the primary winding of the motor 39 to provide adjustable amounts of reduced starting torque. Each of the reactors 70 may be constructed like the reactor 19 of Fig. 3 except that each of the reactors 70 is supplied with intermediate taps 70a and 70b in addition to terminals 70c and 70d. Since the motor 39 is illustrated as a three-phase, three-wire machine, there are three reactors 70, one being connected in each phase. Short circuit protection for the starter and motor of Fig. 9 is provided as in the starter of Figs. 1, 2, and 4, by means of the reactors 19 which are preferably connected in the supply lines between the disconnect switches 10 and the transformers 14, 17, and 18. The transformer 14 supplies voltage for control circuits to be described and the transformers 17 and 18 supply the overload coils 15a and 15b of the overload relay 15 as well as the operating winding of a current limit relay 71. The relay 71 may be of any suitable type but is shown as of the series-lockout type, that is, its contacts 71a remain in the open position as illustrated so long as an operating winding 71w is deenergized or is energized by a large current and move to their closed position only when the current in the winding 71w decreases.

For normal running operations, the motor 39 is arranged to be connected to the supply source 29 through the air-core reactors 19 by means of an electromagnetic run contactor 72 having a plurality of normally-open main contacts 72a, normally-open auxiliary contacts 72b, normally-closed auxiliary contacts 72c, and an operating winding 72w. During starting of the motor 39, the motor 39 is arranged to be connected to the source 29 through the air-core reactors 70 as well as the air-core reactors 19 by means of an electromagnetic starting contactor 74 having a plurality of normally-open main contacts 74a and an operating winding 74w. Preferably, the contactors 72 and 74 are similar to the contactor 12 of Fig. 4 and having an interrupting capacity very greatly in excess of the starting power requirements of the motor 39. Since the contactor 74 is required to open the motor circuit under short-circuit conditions only when the reactors 70 are also in the motor circuit, the contactor 74 may have a lower interrupting capacity than the contactor 72.

A control relay 75 has a normally-open contact 75a and an operating winding 75w. A normally-open, momentary-contact push button 76 is arranged to connect the coil 15f of the overload relay 15 across the secondary of the transformer 14 for resetting of the relay 15. Control of the starting and stopping of the motor 39 is effected by means of a normally-open, momentary-contact start push button 78 and a normally-closed stop push button 79.

Adjustment of the starting voltage applied to the motor 39 is obtained by selectively connecting the respective taps 70a, 70b, or 70d of the reactors 70 to the motor terminals. The reactance of the reactors 70 between the respective terminals 70c and 70d when added to that of the series connected reactors 19 should be such as to provide a very low starting voltage at the motor. In a similar manner, when the respective intermediate taps 70b are connected to the motor, an intermediate value of starting voltage should be obtained, and when the respective taps 70a are connected to the motor a relatively high value of reduced starting voltage should be obtained.

Figure 10:
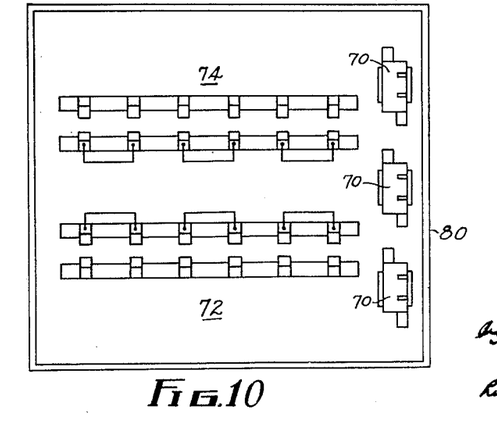
Fig. 10 is a diagrammatic illustration of a preferred arrangement of a portion of the motor starter of Fig. 9, and Figs. 11 and 12 are wiring diagrams illustrating modifications of the starter of Fig. 9.

The contactors 72 and 74 of Fig. 9 may be of the air-break type or mounted under oil in a tank 80 shown diagrammatically in Fig. 10 and which may be similar to the tank 22 of Fig. 2. Preferably the reactors 70 are also placed under the oil and mounted as illustrated along one side of the tank. Since, when the reactors 70 in addition to the reactors 19 are in the circuit, short-circuit currents are limited to very small values, it is not necessary to arrange the reactors 70 so as to minimize electromagnetic forces therebetween.

In the operation of the starter of Fig. 9, closure of the start push button 78 with the switches 10 closed completes an operating circuit for the relay 75 from one side of the transformer 14 through the stop button 79, the start button 78, the winding 75w of the control relay 75, and the normally-closed contacts 15c of the overload relay 15 to the other side of the transformer 14. In response to energization of its winding 75w, the relay 75 closes its contacts 75a which by-pass the push button 78 so that it may be released. Also, upon closure of the push button 78, the winding 74w is energized through the normally-closed contacts 72c and 15c. The contactor 74, in response to energization of its winding 74w, closes its main contacts 74a to complete the previously traced low voltage starting circuit through the reactors 70 to the motor 39. The starting inrush current flowing to the motor 39 causes over-energization of the winding 71w which is supplied from the current transformers 17 and 18 and the series-lockout relay 71 does not close its contacts 71a. After the motor has accelerated to a predetermined speed, the current in the winding 71w decreases and eventually reaches a value permitting the contacts 71a to close. Closure of the contacts 71a completes an obvious operating circuit to the winding 72w of the contactor 72. In response to the energization of its winding 72w, the contactor 72 closes its main contacts 72a to by-pass the reactors 70 so that the motor 39 is connected to the supply circuit 29 through the air-core reactors 19 and the transformers 17 and 18. Closure of the auxiliary contacts 72b completes a by-pass circuit around the contacts 71a and opening of the contactors 72c effects deenergization of the winding 74w causing the contactor 74 to return to its normal position.

In event of an overload or a short-circuit at any time while either one of the contactors 72 or 74 is closed, the overload relay 15 responds as in Fig. 4 to deenergize the closed contactor and disconnect the motor. If a short-circuit caused the operation of the relay 15, the short-circuit current is definitely limited by the reactance of the reactors 19 to a value substantially below the interrupting capacity of the contactor 72 and by the reactors 19 and 70 to a value below the interrupting capacity of the contactor 74.

Stopping of the motor 39 may be effected at any time by opening of the push button 79 as is apparent from the wiring diagram of Fig. 9.

In the starter of Fig. 9, the short-circuit current limiting reactors 19 and the reduced voltage starting reactors 70 are wound on separate spools or wooden cores. In the starter illustrated in Fig. 11, the total reactance required in each phase is provided by a winding having a single core. Thus, each of the air-core reactors 90 of Fig. 11 has a portion 90a for limiting short-circuit currents to values below the interrupting capacity of the run contactor 72 and an additional tapped portion 90b for providing predetermined increased amounts of voltage reduction for starting purposes. Each of the reactor portions 90b has taps 91, 92, and 93 which may be connected selectively to the motor terminals to adjust the starting voltage. Preferably, the reactors 90 are constructed in a manner similar to the reactors 19 and 70.

Figure 11:
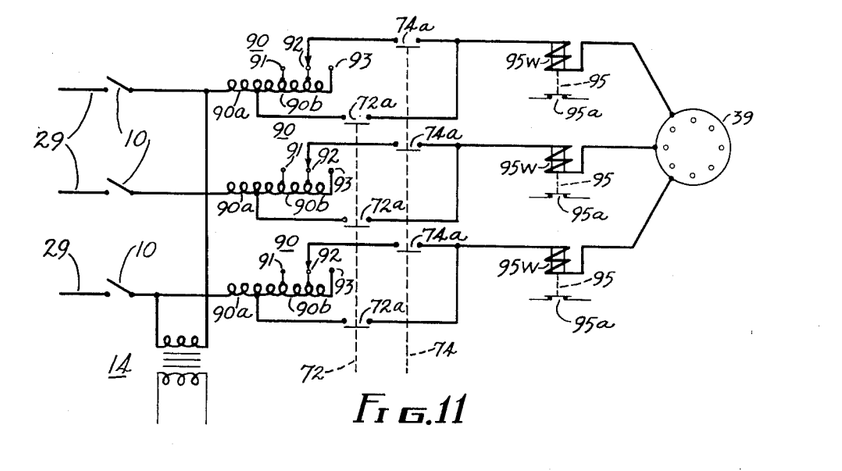

Instead of having current transformers supply the windings of the overload relay as in the starters of Fig. 4 and 9, the starter of Fig. 11 has a plurality of overload relays 95 provided with windings 95w, respectively, which are connected directly in the power supply leads to the motor 39, respectively. The several windings 95w may be arranged to open respective normally-closed contacts 95a to provide short-circuit and overload protection for the motor 39 in a well-known manner. It is to be understood that the reactance of the windings 95w may be taken into account in determining the reactance provided by the reactors 90.

The operation of the starter of Fig. 11 is apparent from the description of the operation of Fig. 9, the contactors 72 and 74 operating in sequence to complete the running and starting connections, and the contacts 95a being connected in series with each other to perform the function of the contacts 15c of Figs. 4 and 9.

Preferably the reactance of the reactors 19 of Fig. 9 and of the portions 90a of the reactors 90 of Fig. 11 is so selected that even if the source 29 is assumed to have an infinite available short-circuit kva. capacity, the maximum available short-circuit kva. at the contactor 72 is limited to a value below the interrupting capacity of the contactor.

Figure 12:
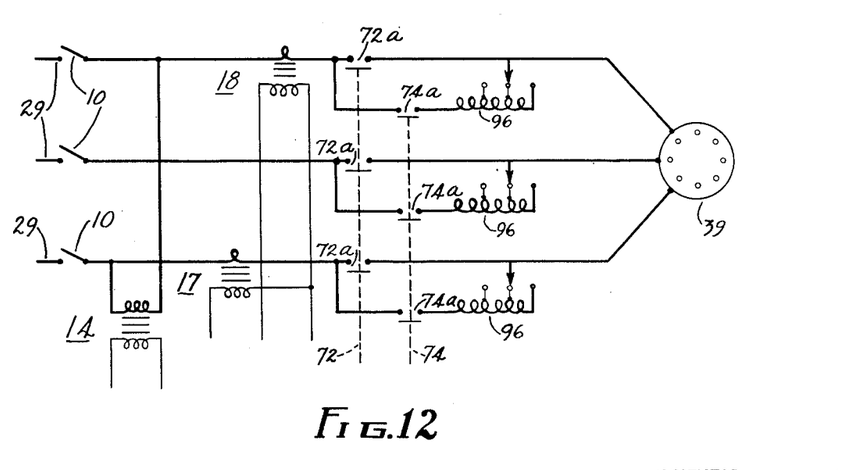

For applications not requiring reactors to limit the available short circuit kva. to a value below the interrupting capacity of the run contactor but requiring reduced voltage during starting, starters such as shown in Fig. 12 may be used. In Fig. 12, tapped air-core reactors 96 provide adjustable values of reduced voltage at the terminals of the motor 39 during starting when the start contactor 74 is closed and the run contactor 72 is open. The reactance of the reactors 96 is so selected that they alone provide the reduced voltage since additional reactance for limiting short circuit current is not required. Complete control circuits are not shown in Fig. 12 since they may be the same as the control circuits of Fig. 9.

The tapped air-core reactors 96 are preferably constructed like the reactors 70 of Fig. 9 so as to take full advantage of simplified manufacturing techniques over those required for conventional iron-core reactors. In addition to the obvious advantages resulting from the simpler method of manufacture of an air-core reactor instead of an iron-core reactor, there is such a large reduction in overall weight and size of the air-core reactors that the manufacturing cost is further reduced and greatly simplified. For example, a three coil iron-core reactor designed to provide 67% starting current to a 2300 volt, 600 H. P. motor having a normal starting current of seven times its full load current rating weighs 760 pounds, whereas three air-core reactors capable of providing the same current reduction for the same motor weigh only 216 pounds. Similar unexpected weight and size reductions are obtained for other sizes of motors.

Although this invention has been described principally in connection with a specific starter for a specific type of A.-C. motor, it will be understood that the principles herein disclosed may find applications with other types of motors and starters either air-break or oil immersed and with branch circuit feeders supplying loads other than motors but having normal power requirements such as contemplated by this invention and controlled by contactors having interrupting capacities sufficient to permit the disproportionate decrease in reactor size as explained hereinbefore. For example, many of the advantages of this invention are obtained when the air-core reactors are used with motors operating at 220 or 440 volts provided that the running contactor has an interrupting capacity sufficiently in excess of the maximum current demand of the motor to obtain the disproportionate decrease in the physical size of the reactors indicated by the curve 68 of Fig. 7.

I claim:

1. A starter for a three-phase alternating current motor comprising a power supply circuit for conducting current to the motor and having three conductors, said circuit being adapted to be connected at one end to a source of alternating current and at the other end to said motor, an electromagnetic contactor interposed in said circuit for opening and closing said circuit, an overload relay for controlling said contactor in dependence upon the amount of current in said circuit, a unitary metal enclosure closely confining said contactor, said conductors, a plurality of air-core reactors, and said relay and having substantially parallel spaced side walls and a rear wall interconnecting the said walls, said air-core reactors being respective to said conductors for limiting fault currents during operation of said motor, means supporting the reactors in spaced relation to each other and with an approximately common magnetic axis for two of the reactors approximately normal to and intersected between said two reactors by the magnetic axis of the third reactor, and means connecting said reactors in said conductors of said circuit respectively.

2. A starter for an alternating current motor comprising a power supply circuit for conducting current to a motor, individual to said circuit, an overload responsive device in said circuit, a run contactor operative in response to said device, a first air-core reactor means of sufficient reactance to limit short-circuit currents to values below the interrupting capacity of said run contactor but above the current responsive value of said overload responsive device, means connecting said run contactor and said first reactor means in series with each other in said circuit, a start contactor operative in response to said device, a second air-core reactor means, means connecting said start contactor and said second air-core reactor means in series with each other and the series-connected combination in parallel with said run contactor and in series with said first reactor means, means for causing closure of said start contactor for starting said motor and for opening said start contactor and closing said run contactor after said motor has accelerated, and the reactance of said second reactor means being sufficient when in series with said first reactor means to limit the voltage at said motor terminals to a value materially below the voltage of said power supply circuit.

3. A motor and motor starter combination comprising an alternating current motor, a power supply circuit for conducting current to said motor and adapted to be connected at one end to a source of alternating current and at the other end connected to said motor, a contactor interposed in said circuit for closing and opening said circuit and having an interrupting capacity many times the maximum starting current of said motor, means for causing said contactor to close said circuit, means responsive to current flow in said circuit in excess of said maximum starting current and less than the interrupting capacity of said contactor for causing said contactor to open said circuit upon occurrence of said excessive current flow, air-core reactor means interposed in said circuit and having insufficient reactance to affect materially the flow of said maximum starting current and sufficient reactance to limit the maximum value of said excessive current to a value below the interrupting capacity of said contactor, a second air-core reactor means, a second contactor having an interrupting capacity in excess of the maximum starting current of said motor, means connecting said second air-core reactor means and said second contactor in series with each other and the series combination in parallel with said first contactor means and in series with said first air-core reactor means, the reactance of said second reactor means being sufficient when added to the reactance of said first reactance means to reduce materially the starting current of said motor, and means for closing said second contactor to start said motor and for closing said first contactor to continue operation of said motor.

4. A starter for an alternating current motor comprising a power supply circuit for conducting current to the motor, said circuit having a plurality of conductors each adapted to be connected at one end to a source of alternating current and at the other end to the motor, a contactor for closing and opening said circuit and having an interrupting capacity many times the maximum starting current of said motor, a source of power connected to said power supply circuit for supplying current therethrough to said motor and having an available current capacity in excess of the interrupting capacity of said contactor, means for causing said contactor to close said circuit, means responsive to current flow in said circuit in excess of the maximum starting current of said motor and less than the interrupting capacity of said contactor for causing said contactor to open said circuit upon occurrence of said excessive current flow, and reactor means interposed in said circuit and having sufficient reactance to effect materially the flow of said maximum starting current and including an air core portion and another portion, a contactor for shunting said other portion and having an interrupting capacity in excess of the maximum starting current of said motor when rated voltage is applied, the air core portion having sufficient reactance to limit the maximum value of said excessive current to a value below the interrupting capacity of said first contactor, and means for closing said first contactor and then said second contactor in delayed sequence for starting said motor.

5. A starter for an alternating current motor comprising a power supply circuit for conducting current to the motor and adapted to be connected at one end to a source of alternating current and at the other end to the motor, a contactor interposed in said circuit for closing and opening said circuit having an interrupting capacity several times the maximum starting current of the motor, means for causing the contactor to close said circuit, means responsive to current flow in said circuit in excess of the maximum starting current of the motor and less than the interrupting capacity of said contactor for causing the contactor to open said circuit upon occurrence of said excessive current flow, air-core reactor means inserted in said circuit for limiting the maximum value of said excessive current to a value below the interrupting capacity of said contactor, said contactor having an interrupting capacity so many times the maximum starting current of the motor that the physical size of the reactor means for a given watts loss therein is disproportionately small as compared to the physical size that would be required for the same watts loss in the reactor means if the reactor means were used to limit the said excessive current to a value below the interrupting capacity of a contactor having an interrupting capacity in excess of, but approximating, the starting current of the motor, a second reactor means having sufficient reactance so that, when its reactance is added to the reactance of said first reactor means, the voltage at the motor terminals is materially reduced during starting of the motor, and a second contactor for connecting said first and second reactor means in series with each other and in said supply circuit during starting of said motor.

6. A starter for a three-phase alternating current motor comprising a power supply circuit for conducting current to the motor and having three conductors, said circuit being adapted to be connected at one end to a source of alternating current and at the other end to the motor, a contactor interposed in said circuit for opening and closing said circuit, air-core reactors respective to said conductors for limiting fault currents in said circuit to values below the interrupting capacity of said contactor, means supporting the reactors in closely spaced relation to each other and with an approximately common magnetic axis for two of the reactors approximately normal to and intersected between said two reactors by the magnetic axis of the third reactor, and means connecting said reactors in said conductors, respectively, of said circuit in series with said contactor.

7. A starter for a three-phase alternating current motor comprising a power supply circuit for conducting current to the motor and having three conductors, said circuit being adapted to be connected at one end to a source of alternating current and at the other end to the motor, an overload responsive contactor means interposed in said circuit for closing said circuit and for interrupting said circuit consequent upon a fault current in said circuit, a metal enclosure housing said conductors and said contactor means, air-core reactors respective to said conductors and within and closely confined by said enclosure for limiting fault currents in said circuit to values below the interrupting capacity of said contactor means, means supporting the reactors in spaced relation to each other and with an approximately common magnetic axis for two of the reactors approximately normal to and intersected between said two reactors by the magnetic axis of the third reactor, and means connecting said reactors in said conductors, respectively, of said circuit in series with said contactor means.

8. A starter for a three-phase alternating current motor comprising a power supply circuit for conducting current to the motor and having three conductors, said circuit being adapted to be connected at one end to a source of alternating current and at the other end to the motor, an overload responsive contactor means interposed in said circuit for closing said circuit and for interrupting said circuit consequent upon a fault current in said circuit, a metal enclosure housing said contactor means and said conductors and having substantially parallel spaced side walls and a rear wall substantially normal to and interconnecting the said side walls, air-core reactors respective to said conductors for limiting fault currents in said circuit to values below the interrupting capacity of said contactor means, means supporting said reactors on said walls, respectively, within and closely confined by said enclosure and with an approximately common magnetic axis for the two of said reactors supported on the side walls approximately normal to and intersected between said two of said reactors by the magnetic axis of the third reactor supported on said rear wall, and means connecting said reactors in said conductors, respectively, of said circuit in series with said contactor means.

9. A starter for a three-phase alternating current motor comprising a power supply circuit for conducting current to the motor and having three conductors, said circuit being adapted to be connected at one end to a source of alternating current and at the other end to the motor, an overload responsive contactor means interposed in said circuit for closing said circuit and for opening said circuit consequent upon a fault current in said circuit, a metal enclosure housing said contactor and said conductors and having substantially parallel spaced side walls and a rear wall interconnecting the said side walls, air-core reactors respective to said conductors for limiting fault currents in said circuit to values below the interrupting capacity of said contactor means, means supporting said reactors on said walls, respectively, within, and closely confined by said enclosure, and means connecting said reactors in said conductors, respectively, of said circuit in series with said contactor means.

10. A starter for a polyphase alternating current motor comprising a power supply circuit for conducting current to the motor and having a plurality of conductors, said circuit being adapted to be connected at one end to a source of alternating current and at the other end to the motor, an overload responsive contactor means interposed in said circuit for closing said circuit and for opening said circuit substantially instantaneously consequent upon a fault current in said circuit, a unitary enclosure housing said contactor means and said circuit, air-core reactors respective to said conductors, each of said air core reactors comprising a spiral coil of insulated conducting material tightly wound upon a nonmagnetic core, means supporting the reactors in closely spaced and substantially non-inductive relation to each other within said enclosure, and means connecting said reactors in said conductors, respectively, of said circuit in series with said contactor means.

11. A starter in accordance with claim 4 characterized in that said air core portion comprises a part of each of a plurality of air core reactors interposed in said conductors, respectively, in substantially non-inductive relation to each other, and said other portion of said reactor means comprises another part of each of said air core reactors.

12. A control combination adapted to be interposed in a branch circuit feeder which connects a load to a source of alternating current having a known voltage and frequency and an available short circuit current capacity many times the normal full load current the load requires to be carried by the feeder and comprising a plurality of branch circuit feeder conductors of current carrying capacity many times less than said available short circuit capacity, and each having an input portion adapted to be connected to the source side of the feeder and an output portion adapted to be connected to the load side of the feeder, switching means interposed in the conductors between said portions, a reactor means including a plurality of air core reactor means interposed in said conductors, respectively, means rendering the air core reactor means substantially non-inductive with respect to each other, said air core reactor means each having a substantially constant self inductance, the current interrupting capacity of said switching means being less than said available short circuit current capacity, and said inductance and said interrupting capacity being related to each other and to said voltage, frequency, available short circuit current capacity, and said normal current in that said reactor means has sufficient reactance at the frequency of the source to limit short circuit currents in said feeder, when said conductors are interposed therein, to values below the interrupting capacity of said switching means while effecting only a small immaterial voltage reduction between said input and output portions when said conductors are carrying said normal current, and in that said interrupting capacity is so many times said normal current that the physical size of said reactor means is disproportionately small as compared to the physical size required if said reactor means were used in a feeder required to carry a full load current materially larger than said normal current.

13. An alternating current power utilization system comprising an electric translating device, a source of alternating current having a known voltage and frequency and an available short circuit current capacity many times the normal full load current of said device, a power supply circuit having a plurality of conductors each connected at one end to said source and at the other end to said device, switching means interposed in said conductors, a reactor means including a plurality of air core reactor means interposed in said conductors, respectively, means rendering the air core reactor means substantially non-inductive with respect to each other, said air core reactor means each having a substantially constant self inductance, the current interrupting capacity of said switching means being less than said available short circuit current capacity, and said inductance and said interrupting capacity being related to each other and to said voltage, frequency, available short circuit current capacity, and normal current in that said reactor means has sufficient reactance at the frequency of the source to limit short circuit currents in said circuit to values below the interrupting capacity of said switching means while effecting only a small immaterial voltage reduction between said source and said device when said circuit is carrying said normal current, and in that said interrupting capacity is so many times said normal current that the physical size of said reactor means is disproportionately small as compared to the physical size required if said reactor means were used in a circuit required to carry a full load current materially larger than said normal current.

14. The control combination of claim 12 characterized in that the inductance of said reactor means is additionally related to said voltage, frequency, available short circuit current capacity, and said normal current in that said reactor means permits currents materially in excess of said normal current to flow in said conductors upon the occurrence of short circuit conditions, an instantaneous overload responsive device has an operating means operatively interposed in one of said conductors and is rendered operative when said excessive current flows through said one conductor, and means are provided for causing said switching means to open said circuit immediately upon operation of said device.

15. A starter for an alternating current motor to be supplied from a source of alternating current having a known voltage and frequency and an available short circuit current capacity many times the starting current of the motor and comprising a plurality of conductors each having an input portion adapted to be connected to the source and an output portion adapted to be connected to the motor, switching means interposed in the conductors between the portions, a reactor means including a plurality of air core reactor means interposed in said conductors, respectively, means rendering the air core reactor means substantially non-inductive with respect to each other, said air core reactor means each having a substantially constant self-inductance, the current interrupting capacity of said switching means being less than said available short circuit current capacity, said inductance and said interrupting capacity being related to each other and to said voltage, frequency, available short circuit current capacity, said starting current, and the rated full load current of the motor in that said reactor means has sufficient reactance at the frequency of the source to limit short circuit currents in said conductors, when said portions are connected to said motor and source, respectively, to values below the interrupting capacity of said switching means but materially in excess of said starting current while effecting only a small voltage reduction between said input and output portions when said conductors are carrying said starting current and said full load current, and in that said interrupting capacity is so many times said full load current that the physical size of said reactor means is disproportionately small as compared to the physical size required if said reactor means were used in a starter for a motor requiring a full load current materially larger than said full load current, and instantaneous overload responsive means operatively connected in said circuit and responsive to said excessive currents to cause said switch means to open said circuit substantially instantaneously upon occurrence of said excessive currents.

16. A motor and motor starter combination comprising an alternating current motor to be supplied from a source of alternating current having a known voltage and frequency and an available short circuit current capacity many times the starting current of the motor, a plurality of conductors each having an input portion adapted to be connected to the source and an output portion connected to the motor, switching means interposed in the conductors between the portions, a reactor means including a plurality of air core reactor means interposed in said conductors, respectively, means rendering the air core reactor means substantially non-inductive with respect to each other, said air core reactor means each having a substantially constant self inductance, the current interrupting capacity of said switching means being less than said available short circuit current capacity, said inductance and said interrupting capacity being related to each other and to said voltage, frequency, available short circuit current capacity, said starting current, and the rated full load current of the motor in that said reactor means has sufficient reactance at the frequency of the source to limit short circuit currents in said conductors, when said input portion is connected to said source, to values below the interrupting capacity of said switching means but materially in excess of said starting current while effecting only a small voltage reduction between said input and output portions when said conductors are carrying said starting current and said full load current, and in that said interrupting capacity is so many times said full load current that the physical size of said reactor means is disproportionately small as compared to the physical size required if said reactor means were used in a starter for a motor requiring a full load current materially larger than said full load current, and instantaneous overload responsive means operatively connected in said circuit and responsive to said excessive currents to cause said switch means to open said circuit substantially instantaneously upon occurrence of said excessive currents.

17. The control combination of claim 15 characterized in that each of said air core reactor means comprises a spiral coil of insulated conducting material tightly wound upon a non-magnetic core.

18. A starter in accordance with claim 15 characterized in that it is for a polyphase motor to be supplied from a polyphase source, and the reactance of each of said air core reactor means in ohms at the frequency of said source is the arithmetical difference between a first quotient obtained by dividing the phase voltage of the source by a current expressed in amperes which is sufficiently less than said interrupting capacity to provide a reasonable factor of safety considering the transient phenomena at the instant of a fault and a second quotient obtained by dividing the phase voltage of the source by said available short circuit current capacity expressed in amperes.

19. A control combination in accordance with claim 18 characterized in that said available short circuit current capacity is assumed to be infinite, whereby the reactance of each of said air core reactor means in ohms is said first quotient.

20. A starter for a polyphase alternating current motor comprising a power supply circuit for conducting current to the motor having a plurality of conductors, said circuit being adapted to be connected at one end to a source of alternating current of known frequency and voltage and at the other end to the motor, an overload responsive contactor means having a predetermined current interrupting capacity interposed in said circuit for closing said circuit and for opening said circuit substantially instantaneously upon a fault current in said circuit, a plurality of air core reactors, means rendering the reactors substantially non-inductive with respect to each other, means connecting said reactors in said conductors, respectively, in series with said contactor means, and the reactance of each of said reactors in ohms at the frequency of said source being the quotient obtained by dividing the phase voltage of said source by a current in amperes which is less than said current interrupting capacity.

21. A starter for an alternating current motor to be supplied from a source of alternating current having a known voltage and frequency and an available short circuit current capacity many times the starting current of the motor and comprising a plurality of conductors each having an input portion adapted to be connected to the source and an output portion adapted to be connected to the motor, switching means interposed in the conductors between the portions, a plurality of air core reactor means interposed in said conductors, respectively, means rendering the air core reactor means substantially non-inductive with respect to each other, said air core reactor means each having a substantially constant inductance and comprising a spiral coil of insulated conducting material tightly wound upon a non-magnetic core, the current interrupting capacity of said switching means being less than said available short circuit current capacity, said inductance and said interrupting capacity being related to each other and to said voltage, frequency, available short circuit current capacity, said starting current, and the rated full load current of the motor in that said reactor means has sufficient reactance at the frequency of the source to limit short circuit currents in said conductors, when said portions are connected to said motor and source, respectively, to values below the interrupting capacity of said switching means but materially in excess of said starting current while effecting only an immaterial voltage reduction between said input and output portions when said conductors are carrying said starting current and said full load current, and instantaneous overload responsive means operatively connected in said circuit and responsive to said excessive currents for causing said switch means to open said circuit substantially instantaneously upon occurrence of said excessive currents.

22. A reduced voltage alternating current starter for a motor operable at the usual low power circuit frequencies, said starter including a contactor means interposed in a plurality of supply conductors for said motor and being of the class wherein a reactor means is connected in said conductors in series with the motor to reduce materially the voltage at the motor terminals during starting of the motor and when the motor reaches a material speed a contactor becomes operative to by-pass said reactor, thereby to impose a higher voltage on the motor terminals, characterized in that said reactor means comprises a plurality of air core reactors respective to said conductors and operative to cause said material voltage reduction in the absence of iron cores, and in that a second air core reactor means is permanently connected in said conductors in series with said motor and has a reactance capable of limiting infinite available short-circuit kva. to a kva. value below the interrupting capacity of said contactor means when said contactor means has an interrupting capacity greatly in excess of the kva. required to start said motor at full voltage.

23. A starter for a polyphase alternating current motor to be supplied from a polyphase source of alternating current having a known voltage and frequency and an available short circuit capacity many times larger than the starting current of the motor and comprising a power supply circuit for conducting current to the motor, said circuit including a plurality of conductors and having an input portion adapted to be connected to a source of alternating current and an output portion adapted to be connected to the motor, an overload responsive contactor means having contacts interposed in said conductors, respectively, for closing said circuit and for opening said circuit substantially instantaneously consequent upon appearance of a fault current in said circuit, a reactor means including a plurality of air core reactors respective to said conductors and each having a substantially constant self inductance, means connecting said air core reactors in said conductors, respectively, in series with said contacts, respectively, a unitary enclosure housing said circuit, said contactor means and said reactor means, the current interrupting capacity of said contactor means being less than said available short circuit current capacity, said inductance and said interrupting capacity being related to each other and to said voltage, frequency, available short circuit current capacity, said starting current, and the rated full load current of the motor in that said reactor means has sufficient reactance at the frequency of the source to limit short circuit currents in said conductors, when said portions are connected to said motor and source, respectively, to values materially below the interrupting capacity of said contactor means but materially in excess of said starting current while effecting only a small voltage reduction between said input and output portions when said conductors are carrying said starting current and said full load current, and in that said interrupting capacity is so many times said full load current that the physical size of said reactor means is disproportionately small as compared to the physical size required if said reactor means were used in a starter for a motor requiring a full load current materially larger than said full load current.

JOHN D. LEITCH.

REFERENCES CITED

The following references are of record in the file of this patent:

UNITED STATES PATENTS

| Number | Name | Date |
|---|---|---|
| 946,473 | Steinmetz | Jan. 11, 1910 |
| 1,149,603 | Torchio et al. | Aug. 10, 1915 |
| 1,327,777 | Randall | Jan. 13, 1920 |
| 1,625,464 | Gay | Apr. 19, 1927 |
| 1,846,030 | Gay | Feb. 23, 1932 |
| 1,921,830 | Krambeer | Aug. 8, 1933 |
| 1,999,301 | Mellon | Apr. 30, 1935 |
| 2,228,093 | Sauer | Jan. 7, 1941 |

FOREIGN PATENTS

| Number | Country | Date |
|---|---|---|
| 196,657 | Great Britain | Apr. 12, 1923 |